(12) United States Patent
Boneberg et al.

(10) Patent No.: US 6,740,303 B2
(45) Date of Patent: May 25, 2004

(54) GAS GENERATING SYSTEM FOR A FUEL CELL SYSTEM AND METHOD OF OPERATING A GAS GENERATING SYSTEM

(75) Inventors: Stefan Boneberg, Beuren (DE); Martin Schaefer, Kirchheim/Teck (DE); Martin Schuessler, Ulm (DE); Erik Theis, Kirchheim/Teck-Nabern (DE); Ralf Heuser, Ulm (DE)

(73) Assignee: Ballard Power Systems AG, Kirchheim-Teck/Naberg (DE)

(*) Notice: Subject to any disclaimer, the term of this patent is extended or adjusted under 35 U.S.C. 154(b) by 281 days.

(21) Appl. No.: 10/061,452

(22) Filed: Feb. 4, 2002

(65) Prior Publication Data

US 2002/0136938 A1 Sep. 26, 2002

(30) Foreign Application Priority Data

Feb. 2, 2001 (DE) .......................... 101 04 607

(51) Int. Cl.⁷ .............. C01B 3/26; B01J 8/04; H01M 8/06
(52) U.S. Cl. .............. 423/652; 252/373; 422/188; 422/198; 423/437.2; 429/17
(58) Field of Search .............. 252/373; 422/188, 422/198; 423/437.2, 652; 429/17

(56) References Cited

U.S. PATENT DOCUMENTS

| | | | |
|---|---|---|---|
| 4,473,622 A | | 9/1984 | Chludzinski et al. |
| 5,741,474 A | * | 4/1998 | Isomura et al. .......... 423/648.1 |
| 6,086,839 A | | 7/2000 | Autenrieth et al. |
| 6,096,286 A | | 8/2000 | Autenrieth |
| 6,241,792 B1 | | 6/2001 | Schuessler et al. |
| 6,268,075 B1 | | 7/2001 | Autenrieth et al. |
| 6,294,149 B1 | | 9/2001 | Autenrieth et al. |
| 6,383,468 B1 | * | 5/2002 | Schussler et al. ............ 423/651 |
| 6,383,469 B1 | * | 5/2002 | Lamla et al. ................ 423/652 |
| 6,447,736 B1 | * | 9/2002 | Autenrieth et al. ......... 422/190 |

FOREIGN PATENT DOCUMENTS

| | | |
|---|---|---|
| DE | 3345958 | 6/1984 |
| DE | 19825772 | 1/1991 |
| DE | 19755814 C1 | 6/1999 |
| DE | 19754013 A1 | 7/2000 |
| DE | 19746251 A1 | 8/2000 |
| DE | 19727588 C1 | 6/2001 |
| DE | 19755815 A1 | 7/2001 |
| DE | 19755813 A1 | 9/2001 |
| JP | 8133701 | 5/1996 |

* cited by examiner

Primary Examiner—Stanley S. Silverman
Assistant Examiner—Maribel Medina
(74) Attorney, Agent, or Firm—Crowell & Moring LLP

(57) ABSTRACT

A gas generating system for a fuel cell system as well as to a method of operating same. In order to provide hydrogen-containing combustible gas as rapidly as possible and to reduce the exhaust gas emissions, for the start of the operation of the gas generating system, at least one catalytic burner is started and the generated heat is used for evaporating a combustion agent and/or water and for the heating-up of an additionally connected partial reforming unit or partial oxidation stage in order to generate a hydrogen-containing gas for the fuel cell unit by reforming or partial oxidation.

24 Claims, 1 Drawing Sheet

GAS GENERATING SYSTEM FOR A FUEL CELL SYSTEM AND METHOD OF OPERATING A GAS GENERATING SYSTEM

BACKGROUND AND SUMMARY OF THE INVENTION

This application claims the priority of German Patent Document No. 101 04 607.3-41, filed Feb. 2, 2001, the disclosure of which is expressly incorporated by reference herein.

The present invention relates to a gas generating system for a fuel cell system as well as to a method of operating a gas generating system according to the preamble of the independent claims.

The various components of a gas generating system, such as the reformers, selective oxidation stages, catalytic burners, require a certain operating temperature for their function, for example, at least 200EC for reforming reactors. For the start of a gas generating system, the components have to be heated to the operating temperature. The heating by means of electric energy is not expedient because of the poor efficiency. In addition, the available electric energy (mainly in vehicles) may be too low for starting the system. Furthermore, the starting time should be as short as possible.

Japanese Patent Document JP 8-133701A teaches providing an excess of oxygen into the catalyst to provide rapid warming for the cold start of a selective oxidation catalyst, so that, in addition to carbon monoxide, hydrogen is also oxidized.

German Patent Document DE 19825772 A1 teaches rapidly preheating a vapor reformer at the start by means of a heating element and subsequently feeding oxygen, together with methanol and water vapor, to the reformer in order to immediately start conversion reactions. After the operating temperature has been reached, the oxygen supply may be stopped.

Finally, German Patent Document DE 3345958 A1 teaches burning methanol with air guiding the hot combustion waste gases for the heat exchange along the catalyst bed in order to subsequently guide them directly through the catalyst bed. When the operating temperature of 480EC has been reached, hydrogen of the fuel cell exhaust gas is used for the heating in order to maintain the required cracking temperature.

It is an object of the present invention to provide a method for a gas generating system for a fuel cell system to start the system as fast as possible, and to provide an appropriately further developed gas generating system. The fuel cell system can be used to supply electricity to any device that consumes electricity, such as the electric motor of a vehicle. In particular, during the starting phase, hydrogen-containing fuel should be made available to the fuel cell system as fast as possible and the exhaust gas emissions should be limited to an acceptable reliable amount.

This object is achieved by means of the embodiments of the invention described below.

In the method according to the invention, for starting the operation of the gas generating system, at least one of the catalytic burners is started and the heat generated by the burner is used for the evaporation of water and of the hydrocarbons (to be fed to the reformer), such as methanol, and for heating a partial reformer connected to the reformer. The partial reformer operates with a lower throughput than the actual reformer of the gas generating system. Instead of the partial reformer, a partial oxidation stage (POX) may be used to convert fed hydrocarbons, such as methanol by means of an oxidant, such as air, to form a hydrogen-containing gas. In this case, the heating of the components takes place essentially by way of the chemical reaction of combustion media so that, for starting the system, only limited electric energy from a vehicle battery is required.

As a result, the method according to the invention can bring at least some of the components of the gas generating system to the operating temperature within a short time. The partial reforming unit or partial oxidation unit supplies reformate or hydrogen-containing gas which is purified with respect to carbon monoxide in a selective oxidation stage connected on the output side. The operation of the fuel cell can be started by means of the purified hydrogen-containing gas. The fuel cell generates current so that a driving operation becomes possible in the case of a vehicle and the auxiliary aggregates of the fuel cell system, such as compressors, are now fed by the fuel cell and no longer by the electric auxiliary energy, such as the vehicle battery. The hot gases or waste gases of the already heated components continuously heat the remaining components. Another advantage is that, also during the cold start of the system, undesirable emissions can be prevented because the emissions can be converted by the catalytic burner or burners.

The invention is particularly suitable for vehicles which are equipped with a fuel cell system.

Other objects, advantages and novel features of the present invention will become apparent from the following detailed description of the invention when considered in conjunction with the accompanying drawings.

DETAILED DESCRIPTION OF THE DRAWINGS

Figure 1:
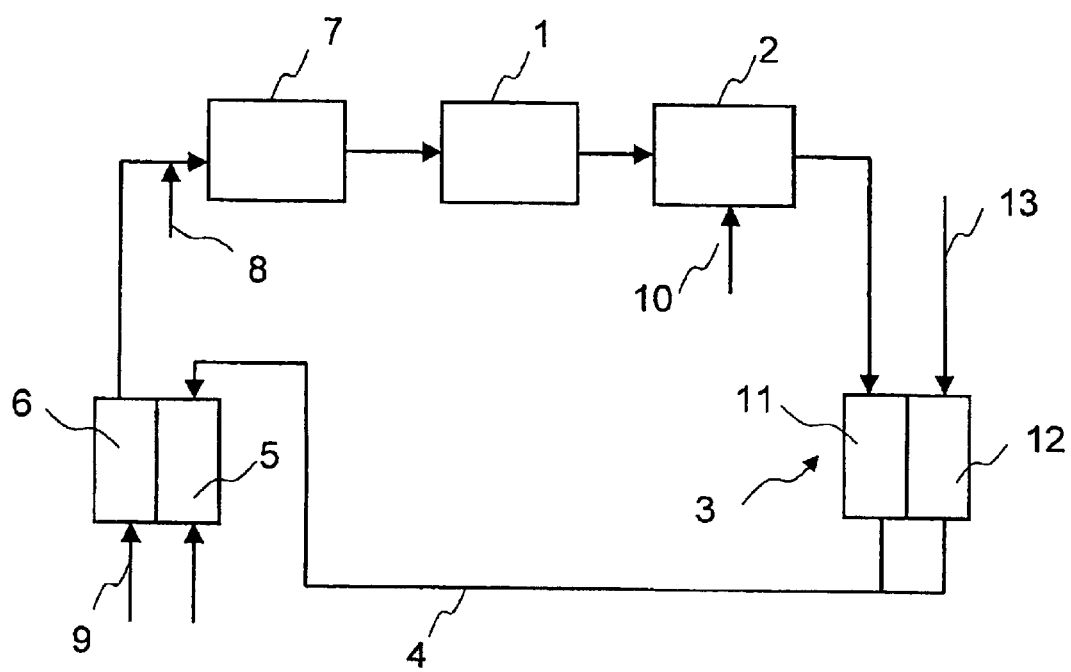
FIG. 1 is a schematic view of a preferred construction for operating a gas generating system according to the invention for a fuel cell system.

FIG. 1 illustrates a fuel cell system with a fuel cell unit 3 which is supplied with hydrogen-containing combustion gas by a gas generating system. The gas generating system has the following components: a reformer 1 for reforming a combustion medium, such as hydrocarbons, alcohols, and ether. The hydrogen-containing reformate contains carbon monoxide. Since carbon monoxide poisons fuel cells, it is necessary to reduce the carbon monoxide fraction in the reformate to below 50 ppm, preferably to below 10 ppm. For this purpose, at least one selective oxidation stage 2 is provided to oxidize catalytically carbon monoxide to carbon dioxide. The oxygen required for this purpose may be supplied in the form of air by way of the air pipe 10. The purified hydrogen-containing reformate is fed to the anode side 11 of the fuel cell unit 3. The oxidant, such as air, arrives by way of the pipe 13 in the cathode side 12 of the fuel cell unit 3. The waste gases of the fuel cell unit 3, essentially water as well as electrochemically non-converted hydrogen, are discharged by way of a pipe 4. A water separator may be provided in this pipe.

Furthermore, a catalytic burner 5 is coupled with an evaporator 6. In the evaporator 6, combustion medium and/or water is evaporated in order to feed these media to the reformer 1 and to a connected partial reforming or POX unit 7. In the catalytic burner 5, the hydrogen of the anode waste gas is exothermally converted to water in the normal operation. For this purpose, hydrogen is fed to the catalytic burner 5 by way of the pipe 4, and the generated heat arrives by way of a heat exchange at the evaporator 6, to which the media to be evaporated are fed by way of a pipe 9.

According to the invention, the partial oxidation stage 7 (POX) or the partial reforming unit 7 coupled with a catalytic burner are provided as additional components of the gas generating system. The partial reforming or partial oxidation stage 7 may be connected in front of or behind the reformer 1. The air containing oxygen required for the reforming is fed by way of the pipe 8 to the partial reforming unit 7, while combustion media, such as methanol and water vapor, are fed by the evaporator 6. When a POX stage 7 is used, the combustion medium (methanol), together with air containing oxygen, are converted directly. The partial reforming unit 7 may be coupled with a separate catalytic burner or with the catalytic burner 5. It is also possible to provide a catalytic burner which heats the evaporator 6 and/or the partial reforming unit 7 by means of hot gas.

According to the invention, first, the at least one catalytic burner 5 and/or that of the partial reforming unit 7 of the gas generating system is started, and the heating can be provided at the starting point optionally by electric assistance. Electric power of a vehicle battery existing in the vehicle is preferably used for this purpose.

A combustion medium, such as the alcohol used for reforming, preferably methanol, is fed to the catalytic burner 5. Hydrogen from a hydrogen tank may also be used. The heat released during the exothermal conversion of the combustion medium is used for the evaporation of the combustion medium (such as methanol) to be fed to the reformer 1. If the combustion medium cannot immediately be fed to the reformer 1 of the gas generating system, it is fed to a correspondingly designed partial reforming stage 7. This partial reformer 7 is in a heat exchange with the catalytic burner 5 and/or with another catalytic burner, so that a rapid lighting-off of the reforming is ensured. According to the invention, instead of the partial reformer 7, a partial oxidation stage 7 (POX) may be used in which the evaporated combustion medium is directly reacted with air. The partial oxidation stage 7 is heated parallel with the catalytic burner 5 or burners. This takes place by the reaction of combustion medium (liquid or gaseous) with air.

After the starting of the fuel cell system, hydrogen-containing anode waste gas of the fuel cell unit 3 can be used for the further supply of the catalytic burner 5 or burners.

There are various phases during the starting of the fuel cell system. The system goes through a warm-up phase, which may be followed by a phase of reduced power, until the normal operation is finally reached. In the phase of reduced power, preferably only 20%–80% of the maximal system power of the normal operation is generated. In the warm-up phase, the components which are required for the operation at a reduced power are first brought to the operating temperature, preferably by the combustion of a combustion medium, such as methanol or hydrogen. After the warm-up phase, in the operationally warm stage, such as a unit for implementing a partial oxidation of the combustion medium or a combined unit with a catalytic burner/reformer, a reformate is produced and is optionally purified with respect to carbon monoxide in a stage for the selective oxidation which is connected on the output side of the reformer. The fuel cell can start its operation with the purified reformate and generates current so that a driving operation is possible, and auxiliary aggregates of the fuel cell system are fed by the fuel cell and no longer by an electric auxiliary source, such as a vehicle battery. Simultaneously, a further heating-up of the remaining components takes place.

If the phase of reduced power is skipped, however, the starting time of the fuel cell system reduced according to the invention will be slightly prolonged.

During the warm-up phase according to the invention, first, components, which are required for the operation at reduced power, are preferably heated to their operating temperature. For the start of the operation of the gas generating system, a fuel, such as the methanol to be reformed, is now fed to the catalytic burner 5 for this purpose. If the partial reforming unit 7 has a separate catalytic burner, or a separate catalytic burner is provided for heating the evaporator 6 and the partial reforming unit 7, the can be implemented also by means of these components. In any case, at least one catalytic burner is started first. The starting of the catalytic burner or burners ensures that undesirable emissions of the cold system can be reduced or prevented because the catalytic burner or burners can largely convert them.

In the further development described below, it is assumed that the partial reforming unit 7 is heated by the catalytic burner 5. It is also possible to use hydrogen from the hydrogen reservoir as combustion medium for the catalytic burner 5. The heat generated by the exothermal catalytic conversion is conveyed to the evaporator 6. It should be pointed out that the evaporator 6 may also be constructed as a hot-gas evaporator with a catalytic burner connected on the input side. The catalytic burner 5 may optionally be briefly heated by means of electric assistance during the start. The catalytic burner 5 may also be constructed in several stages.

According to the invention, a portion of the heat generated in the catalytic burner 5 is supplied to the partial reforming unit 7 in order to heat the latter. The combustion medium supplied by the evaporator 6 and the water vapor are fed together with air from the feeding pipe 8 to the partial reforming unit 7, where a hydrogen-containing reformate is produced. Likewise, it is possible to use a partial oxidation (POX) stage 7 in order to produce a hydrogen-containing gas. By way of the still cold reformer 1, the heated gas arrives in the selective oxidation stage 2 in which it is catalytically purified with respect to carbon monoxide. In order to be able to react higher amounts of carbon monoxide in the selective oxidation stage 2, the selective oxidation stage 2 can be preheated by providing an additional quantity of air oxygen by way of the line 10 so that a portion of the reformate is burned to generate heat. Subsequently, hydrogen-containing purified reformate arrives on the anode side 11 of the fuel cell 3 which can immediately be used for generating current in the phase of reduced power following the warm-up phase. In the reduced-power phase, the fuel cell 3 generates only approximately 20% to 80% of the maximal system power.

During the phase of reduced power, additional components are heated up. In addition to the adding of more air to the preheating of the selective oxidation stage 2, another oxidant may also be added. A portion of the introduced reformate will burn up as a result of the addition of oxidant. Additional air and/or fuel (such as methanol) can also be added into the catalytic burner 5. Furthermore, a continuous heating of the components of the gas generating system takes place indirectly or directly by way of the hot gases or waste gases of the already heated components.

In the phase of reduced power, the maximally available power of the fuel cell system is continuously increased corresponding to the heating of the components until all components of the gas generating system have reached the operating temperature. In the normal operation, the full power of the system can then be utilized.

After the lighting-off of the fuel cells, anode waste gas can be fed to the catalytic burner 5 by way of the pipe 4, so that the fuel quantity to be fed from outside of system can be correspondingly reduced. In normal operation, the catalytic burner 5 is preferably operated by anode waste gas.

Another possibility of ensuring a start particularly at low temperature is the connecting of a cold-start component in front of one or several components of the gas generating system to be heated. This cold-starting component may optionally also be integrated in the stage to be heated. Conceivable cold-starting components are adiabatic catalytic burners or flame burners. These may possibly additionally be equipped with an electric starting device, such as a glow plug and/or spark plug, an additional air apportioning or an additional fuel apportioning. Another possibility includes the connection of a central cold-starting component on the input side, which cold-starting component heats several reactors in parallel.

The schematically illustrated construction may be supplemented by additional components. In particular, cold-starting components, such as adiabatic catalytic burners or flame burners may be provided which, for a start at low temperatures, generate heat as fast as possible by chemical reaction or combustion of fuels. These cold-starting components may be integrated in the components of the gas generating system which are to be heated.

The invention permits a fast start of the operation of a fuel cell system for generating current also at low temperatures. The catalytic burner provided for the reduction of exhaust gas emissions can limit the emissions to an acceptable amount as early as during the starting phase. Simultaneously, the catalytic burner allows the evaporation of the constituents required for the reforming and the preheating of a partial reforming unit or a POX stage in order to be able to generate a hydrogen-containing gas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method of operating a gas generating system for a fuel cell system, the gas generating system including a reformer for reforming hydrocarbons, at least one selective oxidation stage for the removal of carbon monoxide contained in the reformate, and at least one catalytic burner for the catalytic conversion of a fuel, the method comprising:

for the start of the operation of the gas generating system, in a warm-up phase, starting at least one of the catalytic burners using the generated heat for the evaporation of a combustion medium and/or water and for the heating-up of an additionally connected partial reforming unit or a connected partial oxidation stage;

by the reforming or partial oxidation, generating a hydrogen-containing gas flow for the fuel cell unit; and in a phase following the heating-up phase, operating the fuel cell unit at reduced power.

2. Method according to claim 1, further comprising heating the at least one catalytic burner, after the start, by electric power.

3. Method according to claim 1, further comprising feeding hydrocarbons to be reformed or hydrogen from a hydrogen reservoir after the start as fuel to the at least one catalytic burner.

4. Method according to claim 1, further comprising preheating at least one of the selective oxidation stages by an increased supply of air.

5. Method according to claim 1, further comprising heating the at least one catalytic burner by the additional supply of air and/or fuel.

6. Method according to claim 1, using hot gas from at least one of the reformer, the at least one selective oxidation stage, the at least one catalytic burner, and the fuel cell unit to heat at least one of the others.

7. Method according to claim 1, providing at least one of an adiabatic catalytic burner, a flame burner having an electric starting device, and additional air and/or fuel supply, as a cold-stating component in front at least one of the reformer, the at least one selective oxidation stage, and the at least one catalytic burner.

8. Gas generating system for a fuel cell system, comprising:

a reformer for reforming hydrocarbons to produce reformate;

at least one selective oxidation stage for removal of carbon monoxide contained in the reformate;

at least one catalytic burner for the catalytic conversion of a fuel;

an evaporator for evaporation of at least one of hydrocarbons and water, the at least one catalytic burner being thermally coupled to the evaporator; and at least one of a partial reforming unit and a partial oxidation stage for starting the gas generating system, wherein the at least one of the partial reforming unit and the partial oxidation stage is thermally coupled to the at least one catalytic burner.

9. Gas generating system according to claim 8, wherein the at least one catalytic burner is connected with a reservoir for one of hydrocarbons and hydrogen.

10. Gas generating system according to claim 9, wherein the hydrocarbons are methanol.

11. Gas generating system according to claim 8, wherein the at least one catalytic burner has an electric heating device.

12. Gas generating system according to claim 8, further comprising at least one of a an adiabatic catalytic burner and a flame burner, wherein the at least one of the adiabatic catalytic burner and the flame burner is positioned as a cold-starting component in front of at least one of the reformer, the at least one selective oxidation stage and the at least one catalytic burner.

13. Gas generating system according to claim 12, wherein the at least one of the adiabatic catalytic burner and the flame burner has at least one of an electric starting device and an air/fuel supply.

14. A method of operating a gas generating system for a fuel cell system, the method comprising:

starting at least one catalytic burner of the gas generating system to generate heat;

using the generated heat to evaporate at least one of a combustion medium and water;

when the system is not warmed up, heating at least one of a partial reforming unit and a partial oxidation stage and using the at least one of a partial reforming unit and a partial oxidation stage to generate a hydrogen-containing gas flow for the fuel cell unit using the evaporated at least one of a combustion medium and water; and when the system is warmed up, using a reforming unit to generate a hydrogen-containing gas flow for the fuel cell unit using the evaporated at least one of a combustion medium and water, wherein the reforming unit has a higher capacity than the at least one of a partial reforming unit and a partial oxidation stage.

15. The method according to claim 14 further comprising, when the system is not warmed up, heating the at least one catalytic burner using electric power.

16. The method according to claim 14 further comprising, when the system is not warmed up, feeding, as fuel, at least one of hydrocarbons or hydrogen from a tank to the at least one catalytic burner.

17. The method according to claim 14 further comprising, when the system is not warmed up, preheating at least one selective oxidation stage by an increased supply of air.

18. The method according to claim 17 further comprising, when the system is not warmed up, heating the at least one catalytic burner by an increased supply of air or fuel.

19. The method according to claim 17 further comprising at least one of an adiabatic catalytic burner or a flame burner, which is connected as a cold-stating component in front of at least one of the reformer, the at least one selective oxidation stage, and the at least one catalytic burner.

20. The method according to claim 14 further comprising using hot gas from ate least one of the reformer, the at least one selective oxidation stage, the at least one catalytic burner, and the fuel cell unit to heat at least one of the others.

21. A gas generating system for a fuel cell system, comprising:

a catalytic burner for the catalytic conversion of a fuel;

an evaporator for evaporating at least one of hydrocarbons and water, the catalytic burner being thermally coupled to the evaporator;

at least one of a partial reforming unit and a partial oxidation stage for use when the system temperature is below a normal operating range, wherein the at least one of the partial reforming unit and the partial oxidation stage is thermally coupled to the at least one catalytic burner;

a reformer for reforming hydrocarbons to produce reformate, the reformer being used when the system temperature is within the normal operating range; and at least one selective oxidation stage for removal of carbon monoxide contained in the reformate.

22. The gas generating system according to claim 21, wherein the catalytic burner is connected with a reservoir for one of hydrocarbons to be reformed and hydrogen.

23. The gas generating system according to claim 21, wherein the catalytic burner has an electric heating device.

24. The gas generating system according to claim 21, wherein at least one of an adiabatic catalytic burner or a flame burner is positioned in front of at least one of the reformer, the selective oxidation stage and the catalytic burner.

* * * * *